United States Patent
Zhang et al.

(10) Patent No.: US 11,763,230 B2
(45) Date of Patent: Sep. 19, 2023

(54) TREND DETECTION VIA MACHINE LEARNING MODELS

(71) Applicant: ASAPP, Inc., New York, NY (US)

(72) Inventors: Tianyi Zhang, Ithaca, NY (US); Sam Altschul, New York, NY (US); Kilian Weinberger, Ithaca, NY (US); Michael Griffiths, New York, NY (US); Geoffrey Michael Pleiss, Ithaca, NY (US)

(73) Assignee: ASAPP, INC.

( * ) Notice: Subject to any disclaimer, the term of this patent is extended or adjusted under 35 U.S.C. 154(b) by 703 days.

(21) Appl. No.: 16/715,118

(22) Filed: Dec. 16, 2019

(65) Prior Publication Data

US 2021/0182868 A1    Jun. 17, 2021

(51) Int. Cl.
| | |
|---|---|
| *G06Q 10/0633* | (2023.01) |
| *G06Q 30/016* | (2023.01) |
| *G06N 3/02* | (2006.01) |
| *G06N 20/10* | (2019.01) |
| *G06V 40/20* | (2022.01) |
| *G06V 10/764* | (2022.01) |

(Continued)

(52) U.S. Cl.
CPC .......... *G06Q 10/0633* (2013.01); *G06N 3/02* (2013.01); *G06N 20/10* (2019.01); *G06Q 30/016* (2013.01); *G06V 10/764* (2022.01); *G06V 10/82* (2022.01); *G06V 20/41* (2022.01); *G06V 40/20* (2022.01); *G06V 20/44* (2022.01)

(58) Field of Classification Search
USPC ............... 705/1.1; 706/45, 20, 50; 704/275; 379/265; 709/224, 206; 707/741; 726/22; 463/29; 702/184
See application file for complete search history.

(56) References Cited

U.S. PATENT DOCUMENTS 7,437,338 B1 * 10/2008 Forman ............... G06F 16/2455
706/20
10,521,443 B2 * 12/2019 Brunets ................. G06F 16/285
707/741

(Continued)

FOREIGN PATENT DOCUMENTS

CA    3042921 A1 *  11/2019  ......... G06F 16/9038

*Primary Examiner* — Lynda Jasmin
*Assistant Examiner* — Kimberly L Evans
(74) *Attorney, Agent, or Firm* — HIPP LAW

(57) ABSTRACT

Machine learning-based approaches are used to detect trends of behavior and anomalous events from customer support messages between customers and customer support agents or other appropriate resources in an electronic environment. For example, for a plurality of time periods, a prediction model can be trained. The prediction models can be trained on messages that correspond to each prediction models' period of time. The prediction models can process messages to determine a score (e.g., a representative confidence score) for the time period a prediction model is associated with. For a selected time period, a model (e.g., a trend detection model) can be applied to the scores for time periods before the selected time period to determine whether the score for the selected time period is associated with an anomalous event. Thereafter, an alert can be presented with, for example, the messages that triggered the alert, among other such information.

18 Claims, 13 Drawing Sheets

(51) Int. Cl.
*G06V 10/82* (2022.01)
*G06V 20/40* (2022.01)

(56) References Cited

U.S. PATENT DOCUMENTS

| | | | |
|---|---|---|---|
| 10,554,817 B1* | 2/2020 | Sullivan | H04L 41/5054 |
| | | | 379/265 |
| 2016/0014151 A1* | 1/2016 | Prakash | H04L 45/74 |
| | | | 726/22 |
| 2017/0099200 A1* | 4/2017 | Ellenbogen | H04L 67/10 |
| | | | 709/224 |
| 2018/0053114 A1* | 2/2018 | Adjaoute | G06N 20/00 |
| | | | 706/45 |
| 2019/0095313 A1* | 3/2019 | Xu | G06F 17/18 |
| | | | 702/184 |
| 2020/0151253 A1* | 5/2020 | Wohlwend | G06N 3/044 |
| | | | 702/184 |
| 2020/0211325 A1* | 7/2020 | Kaizerman | A63F 13/75 |
| | | | 463/29 |
| 2020/0280530 A1* | 9/2020 | Kessler | H04L 47/50 |
| | | | 709/206 |
| 2020/0388271 A1* | 12/2020 | Dunn | G06Q 30/0281 |
| | | | 704/275 |
| 2021/0056451 A1* | 2/2021 | Han | G06N 7/01 |
| | | | 706/50 |
| 2021/0065029 A1* | 3/2021 | Zhang | G06K 9/6256 |
| | | | 706/45 |

* cited by examiner

TREND DETECTION VIA MACHINE LEARNING MODELS

BACKGROUND

As the number of services and products offered to customers increases, there is a corresponding increase in the need to efficiently interact with those customers. For example, customers may need to obtain information about services and/or products offered by a company, may have a question about billing, or may need technical support from the company. In any such situation, customers may interact with these companies in a variety of different ways. For example, customers may interact with a company via a company website, application, telephone call, customer support provider, etc., to submit customer support requests and obtain information via an interactive interface or customer support agent.

However, due to the large amount of customer support requests handled by customer support agents, it may be expensive in terms of time and resources to identify customer issues in real-time. In many situations, it may be even more challenging to sift through past customer support messages to identify trends in customer support messages and prepare for similar customer issues reflected in those messages. In conventional approaches, a customer support agent may escalate reoccurring issues. Customer support teams may also hold daily, weekly, etc., meetings to review trends of behavior and develop processes to prepare for similar issues in the future. However, not all customer support agents may escalate requests due to workload, time, and so on. As such, certain issues may be missed, and procedures may not be developed to handle similar issues.

Further, customer support service providers may not have the resources to review past messages to identify new and similar issues. Thus, while some issues may be resolved, customer support service providers lack the level of resolution into current and past customer support messages to quickly respond to current issues, as well as find interpretable trends of behavior based on past messages, costing the company time and money. Accordingly, it is desirable to provide improved techniques for managing customer support messages.

BRIEF DESCRIPTION OF THE DRAWINGS

Various embodiments in accordance with the present disclosure will be described with reference to the drawings, in which.

DETAILED DESCRIPTION

Figure 1A:
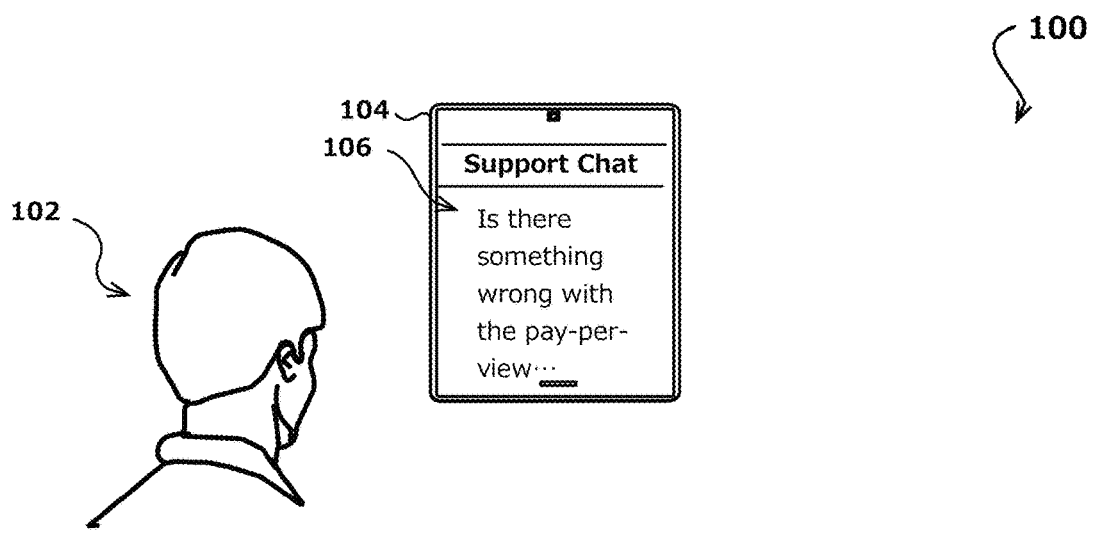
FIGS. 1A, 1B, and 1C illustrate example approaches to receiving customer support requests in accordance with various embodiments.

Systems and methods in accordance with various embodiments of the present disclosure may overcome one or more of the aforementioned and other deficiencies experienced in conventional approaches to managing customer behavior in an electronic environment. In particular, various embodiments describe machine learning-based approaches for detecting trends of behavior and anomalous events from customer support messages between customers and customer support agents or other appropriate resources in an electronic environment.

For example, in accordance with various embodiments, for each one of a plurality of time periods, a model (e.g., a prediction model such as a logistic regression model or another machine learning-based model) can be trained. The prediction models can be trained on messages that correspond to each prediction models' period of time. The messages can be obtained from, for example, company records, customer support logs, a stream of customer support messages, computer/server communication logs, computer-readable data sent between one or more computers (e.g., message logs, instructions, code, etc.), and the like. The messages for each time period can be separated into sets of messages. For example, a first set of messages, a second set of messages, and a holdout set of messages, where the first set of messages includes messages received before a time period, the second set of messages includes messages received during the time period, and the holdout set of messages includes messages received during the time period and disjoint from the second set of messages.

The prediction models can process messages to determine a score (e.g., a representative confidence score) for each time period a prediction model is associated with. For a selected time period, a model (e.g., a trend detection model) can be applied to the scores for time periods before the selected time period to determine whether the score for the selected time period is associated with an anomalous event. Thereafter, an alert can be presented with, for example, the messages that triggered the alert, business metrics such as a volume of messages causing the alert or a cost for customer support agents to respond to the volume of messages, a graphical representation of textual data, an organized display of textual data, a word cloud, among other such information.

Instructions for causing a computer system to detect trends of behavior and anomalous events from customer support messages between customers and customer support agents or other appropriate resources in accordance with the present disclosure may be embodied on a computer-readable medium. For example, in accordance with an embodiment, a backend system may train prediction models for a plurality of time periods. The prediction models can be trained on customer support messages. The backend system can utilize models trained for different periods of time and other components to determine a score (e.g., a representative confidence score) for each time period. For a selected time period, a model (e.g., a trend detection model) can be applied to the scores for periods of time before the selected time period to determine whether the score for the selected time period is associated with an anomalous event. Thereafter, a visualization component, notification component, or other appropriate components of the backend system can generate an alert that can be presented with, for example, messages that triggered the alert, business metrics such as a volume of messages causing the alert or a cost for customer support agents to respond to the volume of messages, a graphical representation of textual data, an organized display of textual data, a word cloud, among other such information.

It should be noted that although the techniques described herein may be used for a wide variety of messages, for clarity of presentation, messages described herein are received from customers desiring customer support for a product, a service, or other offerings from a company and/or appropriate entity. The techniques described herein, however, are not limited to customer support messages, and the messages may be from users who are not customers and detecting trends of behavior and anomalous events from customer support messages may be performed by a third-party on behalf of another company.

Embodiments provide a variety of advantages. For example, in accordance with various embodiments, machine learning-based approaches to automatically detect trends of behavior and anomalous events from customer support messages between customers and customer support agents or other appropriate resources in an electronic environment can be utilized by any system that attempts to optimize resource usage including computing system resources such as feedback systems, resource allocation systems, response systems, and the like. These systems may be utilized by, for example, customer service platforms, airline booking platforms, accommodation booking platforms, financial platforms, medical platforms, electronic marketplaces, online bidding platforms, and other environments where customer service may be needed. In accordance with various embodiments, by providing a system that automatically detects trends of behavior and anomalous events from customer support messages, the system can more efficiently utilize resource capacity. For example, approaches described herein can improve the overall performance of responding to requests of customers seeking customer support from a company through near-instantaneous responses to such requests. For example, an alarm can immediately be triggered when something wrong is detected, and the event that triggered the alarm can be addressed. Additionally, new and similar behaviors can be detected and appropriate addressed. The process is improved by using machine learning-based techniques to optimize resource utilization of various resources. In certain embodiments, one or more trained models can be updated over at least one period of time using computer-readable information based on one or more performance metrics to ensure optimal usage of various resources. Further, approaches described herein advantageously provide for improved responses to potential customer issues. This can reduce idle resources, or other such inefficiencies of the resources, which can maximize resource usage and reduce cost.

Various other functions and advantages are described and suggested below as may be provided in accordance with the various embodiments.

Figure 1B:
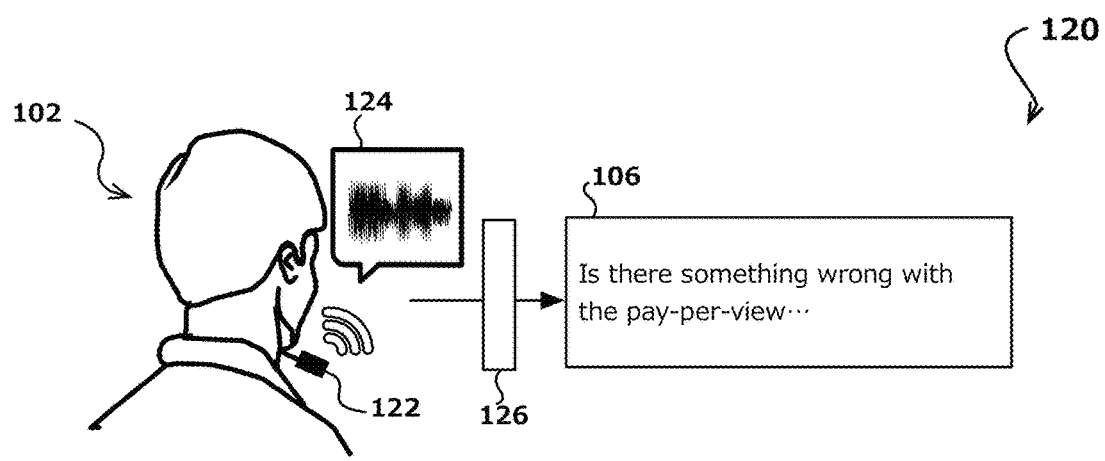
Figure 1C:
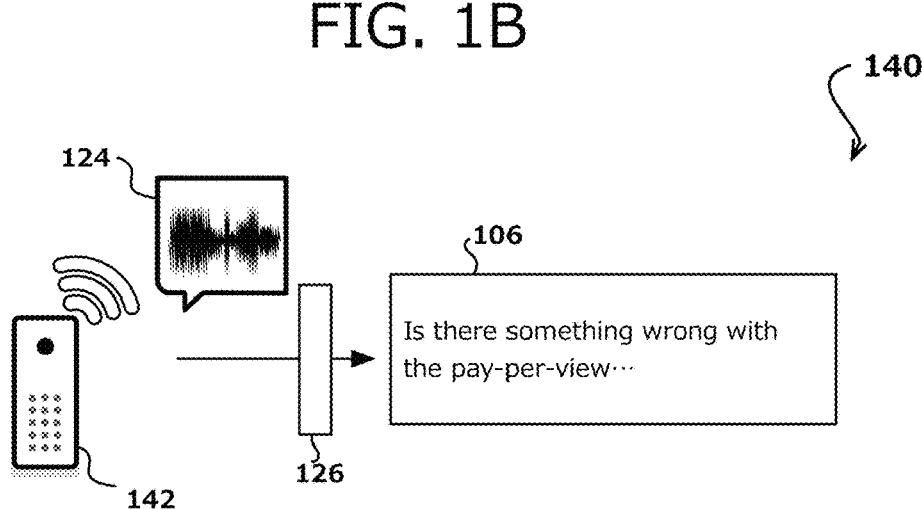

FIGS. 1A, 1B, and 1C illustrate example approaches to receiving customer support messages that can be utilized in accordance with various embodiments. In accordance with various embodiments, the messages can be obtained from customer support sessions between a customer and customer support agent, and can generally describe issues that customers are experiencing. The messages can be from a text exchange between a customer and customer support agent, such as through instant messaging, email, and the like; a conversation, such as one over a phone, internet, etc., or a combination thereof. For example, as shown in example 100 of FIG. 1A, customer 102 is using computing device 104 to communicate with a customer support agent or an automated customer support service. In this example, the customer is inquiring about an issue. In particular, the customer is sending text-based message 106 to inquire whether there "is something wrong with the pay-per-view."

In example 120 of FIG. 1B, customer 102 is talking into a headset 122 to send a voice-based message 124 to a customer support agent. Although a headset is shown, it should be understood that any electronic device capable of receiving and/or processing audio data can be used in accordance with various embodiments discussed herein, where the devices can include, for example, mobile phones, tablets, microphones, notebook computers, personal data assistants, among others. The headset, in this example, can include at least one microphone and/or speaker. The headset can further include one or more internal processing components (not shown), such as an analog-to-digital (A/D) converter, an audio processing engine, an audio classification engine, a time domain conversion module, etc. Further components and software both related and not related to voice capture, according to various embodiments, may also be included in the headset or otherwise in communication with the headset.

In example 140 of FIG. 1C, an audio communications device 142, is sending a voice-based message 124 to a customer support agent. In an embodiment, audio communication device 142 can include, for example, portable computing devices, notebook computers, ultra books, tablet computers, mobile phones, personal data assistants, video gaming consoles, televisions, set top boxes, smart televisions, portable media players, and wearable computers (e.g., smart watches, smart glasses, bracelets, etc.), display screens, displayless devices, other types of display-based devices, smart furniture, smart household devices, smart vehicles, smart transportation devices, and/or smart accessories, or any device having a microphone, speaker, or other component(s) or software configured to analyze, generate, and communicate audio data in the frequency range in which humans communicate or any detectable frequency range.

Text from the customer support messages can be obtained using text extraction techniques, speech recognition techniques, and the like. For example, in example 100 of FIG. 1A, customer 102 is typing a message to the customer support agent. A text extraction technique can be used to extract the text from the message. In examples 120 and 140, voice-based message 124 can be received at a speech-to-text component 126 configured to use one or more speech recognition techniques to convert speech to text. In an example, an A/D converter of the audio analyzing component can sample the audio data to convert the audio data into digital audio data. At least one speech recognition technique can be used to convert the digital audio data to text. It should be noted that any one of a number of text extraction techniques and speech recognition techniques can be utilized in accordance with embodiments described herein.

Once the messages are obtained and the text determined, the text from the customer support messages can be analyzed to detect anomalous events and trends of behavior. In certain embodiments, an alert can be triggered to alert an appropriate entity of an anomalous event. In various embodiments, business metrics such as the volume of messages causing the alert, a cost for customer support agents to respond to the alert or respond to the volume of messages, can be provided.

Figure 2:
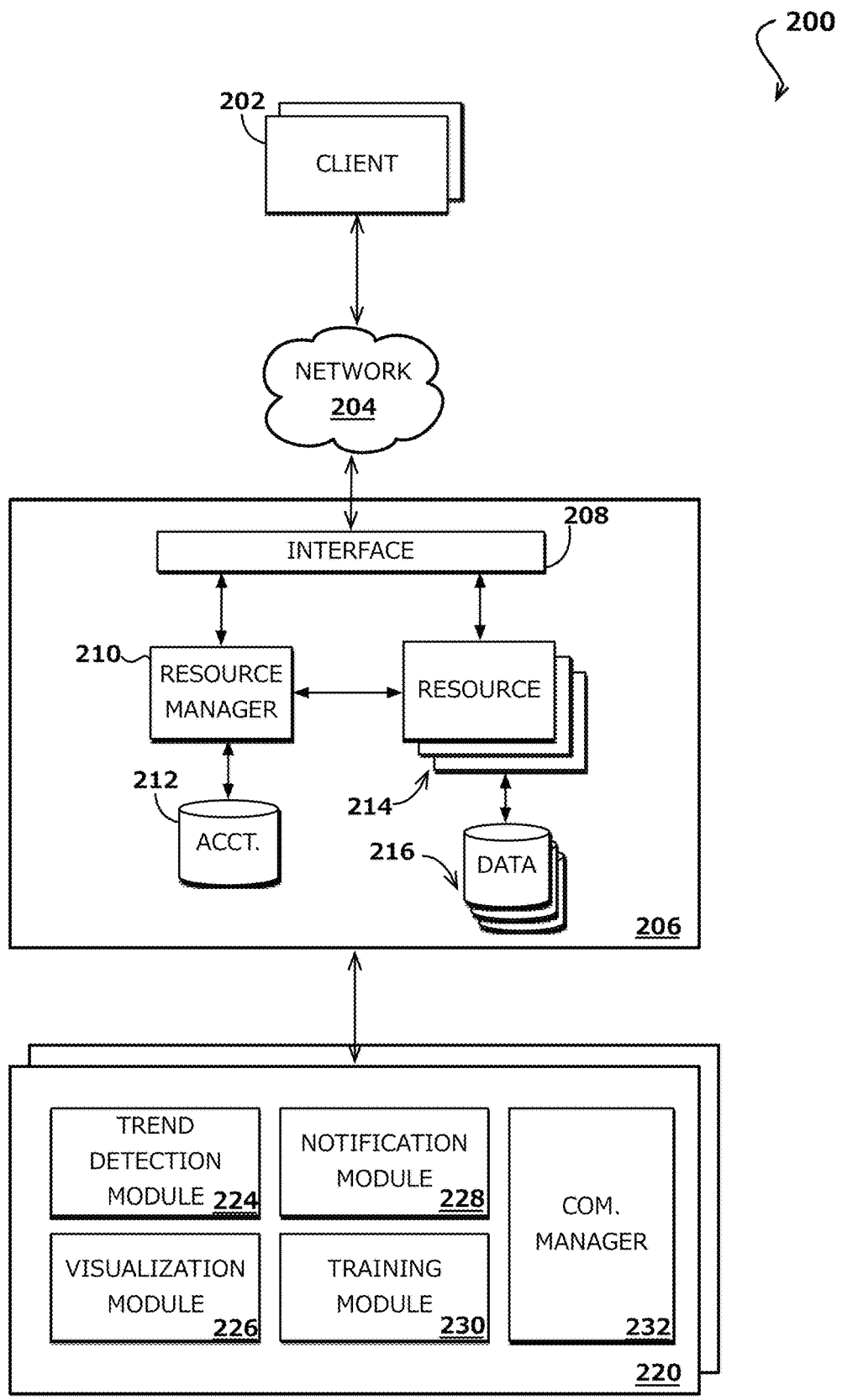
FIG. 2 illustrates an example environment in which aspects of the various embodiments can be implemented.

FIG. 2 illustrates an example environment 200 in which aspects of the various embodiments can be implemented. In this example, a user can utilize a client device 202 to communicate across at least one network 204 with a resource provider environment 206. The client device 202 can include any appropriate electronic device operable to send and receive requests, messages, or other such information over an appropriate network and convey information back to a user of the device. Examples of such client devices 202 include personal computers, tablet computers, smartphones, notebook computers, and the like. The user can include a person authorized to manage the aspects of the resource provider environment.

The resource provider environment 206 can provide customer support services for companies for various services. These services can include, for example, payment services, technical support services, human resource services, among other such services, products, and/or offerings. In certain embodiments, resource provider of environment 206 can be an intermediary between a customer of a company and the company. The provider can, for example, assist a company by providing customer support for the company. This can include, for example, identifying and alerting the company of problematic issues raised by customers, detecting trends of behavior/issues from customer support sessions, providing business insights based on the problematic issues and trends, automatically responding to customer support requests, connecting a customer with a customer service representative (CSR), customer support agent, etc., selecting a CSR to process a customer support request, establishing customer support sessions between customers and CSRs, providing resources to CSRs to process customer support requests, etc. In various embodiments, the functions of a CSR can be performed in hardware and software, such as by using a trained model, a person, or combination thereof.

The network(s) 204 can include any appropriate network, including an intranet, the Internet, a cellular network, a local area network (LAN), or any other such network or combination, and communication over the network can be enabled via wired and/or wireless connections.

The resource provider environment 206 can include any appropriate components for receiving customer support requests and/or messages and returning information or performing actions in response to those requests. It should be noted that although the techniques described herein may be used for a wide variety of users and requests, for clarity of presentation, examples of companies providing a response to a customer support request of a customer will be used. The techniques described herein, however, are not limited to customers and companies, and responses may be provided to requests from users who are not customers, and responses may be from any entity or person.

The resource provider environment 206 might include Web servers and/or application servers for receiving and processing requests then establishing customer support sessions and/or assigning customer support requests. While this example is discussed with respect to the internet, web services, and internet-based technology, it should be understood that aspects of the various embodiments can be used with any appropriate services available or offered over a network in an electronic environment.

In various embodiments, resource provider environment 206 may include various types of resources 214 that can be used to facilitate customer support sessions between customers and customer support agents.

The resources can include, for example, a communications session queue operable to maintain a queue of customer service requests, a communications session server operable to facilitate establishing customer support sessions and/or assigning customer support requests, a management component operable to obtain customer support messages, application servers operable to process instructions provided by a user or database servers operable to process data stored in one or more data stores 216 in response to a user request. The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or components.

In at least some embodiments, an application executing on the client device 202 that needs to access resources of the provider environment 206, for example, to initiate an instance of a trend detection service, can submit a request that is received to interface layer 208 of the provider environment 206. The interface layer 208 can include application programming interfaces (APIs) or other exposed interfaces enabling a user to submit requests, such as Web service requests, to the provider environment 206. Interface layer 208 in this example can also include other components as well, such as at least one Web server, routing components, load balancers, and the like.

When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as communicating the request to a management component or other control component which can be used to manage one or more instances of a trend detection service as well as other information for host machines, servers, or other such computing devices or assets in a network environment, authenticate an identity of the user submitting the request, as well as to determine whether that user has an existing account with the resource provider, where the account data may be stored in at least one data store 212 in the resource provider environment 206.

For example, the request can be to instantiate a trend detection service on host machine 220. The trend detection service can utilize trend detection module 224, notification module 228, visualization module 226, training module 230, and communication manager 232, to detect anomalous events from customer support messages, identify trends of behavior/events from the customer support messages, generate visual summaries of the events, provide business insights, etc. It should be noted that although host machine 220 is shown outside the provider environment, in accordance with various embodiments, one or more modules of the trend detection service can be included in provider environment 206, while in other embodiments, some of the modules may be included in the provider environment. It should be further noted that host machine 220 can include or at least be in communication with other components, for example, a customer support session manager, etc.

Figure 3:
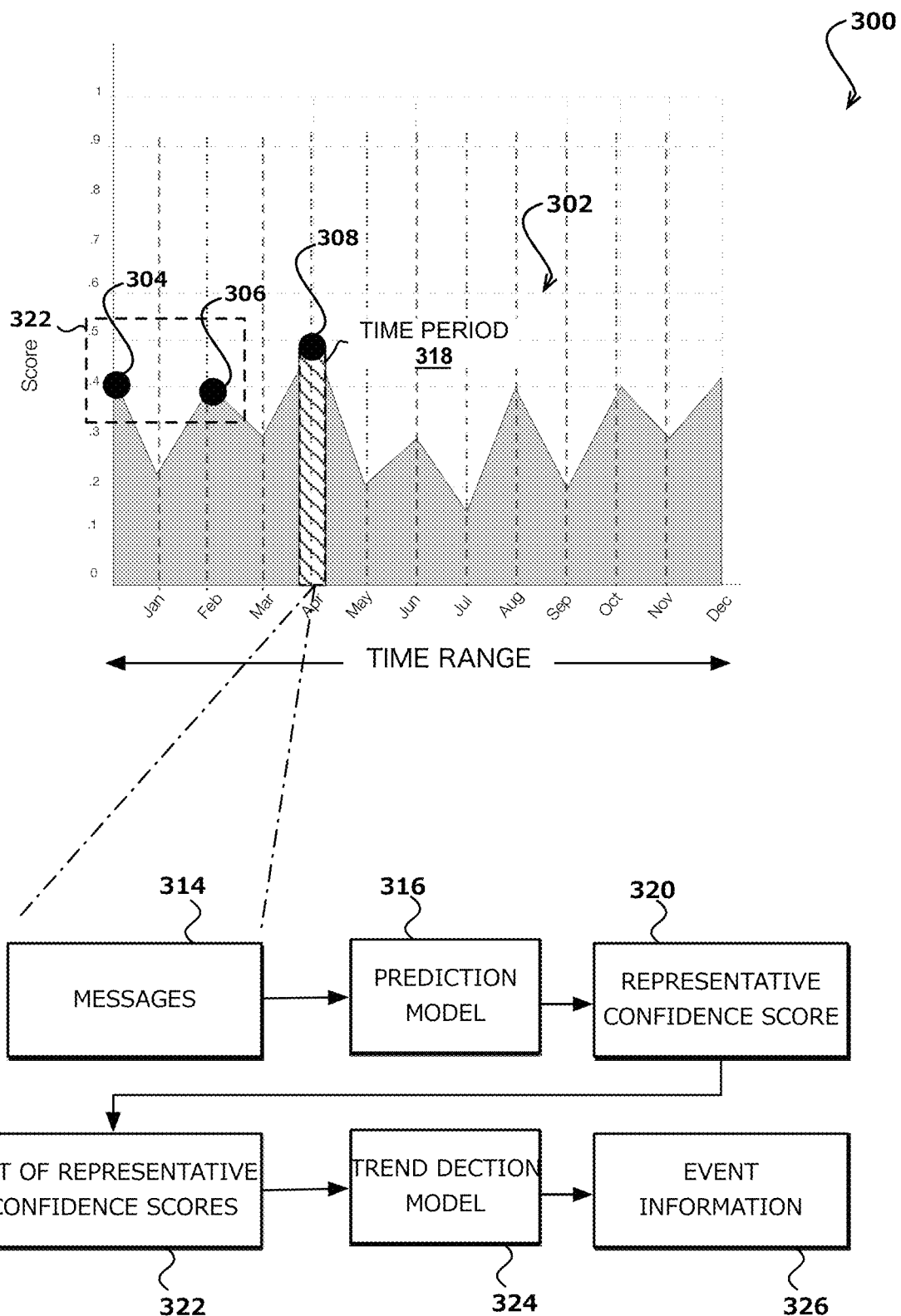
FIG. 3 illustrates an example approach to detecting anomalous event and trends of behavior in accordance with various embodiments.

FIG. 3 illustrates an example approach 300 to detecting anomalous events and trends of behavior in accordance with various embodiments. It should be understood that reference numbers are carried over between figures for similar components for purposes of simplicity of explanation, but such usage should not be construed as a limitation on the various embodiments unless otherwise stated. In this example, graph 302 illustrates a graphical representation of trends of behavior determined from messages between customers and customer support agents. The x-axis represents time and the y-axis represents a level of confidence. As shown, the x-axis illustrates a time range of one year, and a time period of a week every four weeks. It should be noted that the time range, time period, and time period interval can be other amounts of time, and the times used are for example purposes. For example, the time period and/or time period interval can be amounts measured in, e.g., real-time, seconds, minutes, hours, daily, etc. The y-axis can be represented as a number, e.g., a number between zero and one, a number between zero and 100, a percentage, etc. Each number can correspond to a confidence score that represents the likelihood that for a particular time interval an event occurred. Dots 304, 306, and 308 represent spikes or trends of behavior for a particular time period.

As part of the process for detecting anomalous events and trends of behavior, a plurality of messages 314 is obtained. The messages can be obtained from, for example, company records, customer support logs, a stream of customer support messages, computer/server communication logs, computer-readable data sent between one or more computers (e.g., message logs, instructions, code, etc.), or otherwise obtained. The messages can be separated into sets. In various embodiments, the messages can be separated into sets based on the size of a period of time. For example, a first set of messages, a second set of messages, and a holdout set of messages, where the first set of messages includes messages received before a time period, the second set of messages includes messages received during the time period, and the holdout set of messages includes messages received during the time period and disjoint from the second set of messages. In various embodiments, the period of time can be, for example, predetermined, user-specified, etc.

Prediction model 316 (e.g., logistic regression over unigrams or bigrams, neural network, etc.) is trained on the first set of messages and the second set of messages to predict whether a message is received before time period 318 or during time period 318. For example, prediction model 316 can be used to evaluate each message in the holdout set of messages to obtain a set of confidence scores corresponding to the holdout set of messages, where a confidence score can quantify the likelihood a message is received before or during the time period. In accordance with an embodiment, this can include, for example, processing the text of the messages utilizing Vowpal Wabbit or other machine-based learning algorithm, and using a hash function on the text to build a bag-of-words (BOW) representation. In this example, each word can be processed using a hash function to generate feature vectors for the model, where the resulting feature vectors are bag-or-words representations. Other BOW representations can be used as well, including, for example, TF-IDF weights and/or n-grams etc. The hashed BOW feature vector can then be used to train the model, which can be used in accordance with embodiments described herein to obtain the set of confidence scores.

The set of confidence scores can be processed to determine representative confidence score 320 for time period 318 based on the set of confidence scores. For example, the representative confidence score for the time period can be the confidence score corresponding to a confidence score threshold. In an example, the representative confidence score can be the confidence score corresponding to the 95th percentile confidence score. In certain embodiments, the representative confidence score may be an average or the median of representative confidence scores. For example, a plurality of messages associated with a period of time can be split into a plurality of groups of first sets of messages, second sets of messages, and holdout sets of messages. A representative confidence score can be determined for each holdout set of messages of the plurality of groups to obtain a set of representative confidence scores, and the representative confidence score for the period of time can correspond to one of the average or median of the scores. In yet another example, representative confidence scores from the set of representative confidence scores that meet a threshold representative confidence score can be selected, and the selected representative confidence scores can be averaged. The average representative confidence score of the selected scores can correspond to the representative confidence score for the period of time.

Set of representative confidence scores 322 from a plurality of prediction models trained over a plurality of previous time periods can be obtained. Trend detection model 324 can be applied to set of representative confidence scores 322 to determine whether representative confidence score associated with time period is associated with an anomalous event. For example, using the set of representative confidence scores 322, a model can generate data to fit the distribution of the scores. In an embodiment, the model can be a Gaussian mixture model that can generate a set of points which approximately fit the set of representative confidence scores. In the situation a representative confidence score does not fit the set of points by a threshold amount, or the model otherwise detects an outlier, or other condition is satisfied, an anomalous event may be detected. In any situation, event information 326 for the period of time can be stored for use in one or more other purposes. For example, in the situation an anomalous event is detected, an alert for the anomalous event can be generated and presented to an appropriate entity. It should be noted that various other models can be applied as well within the scope of the various embodiments, such as, e.g., a change point detection model, RANSAC, or other outlier detection model.

Figure 4A:
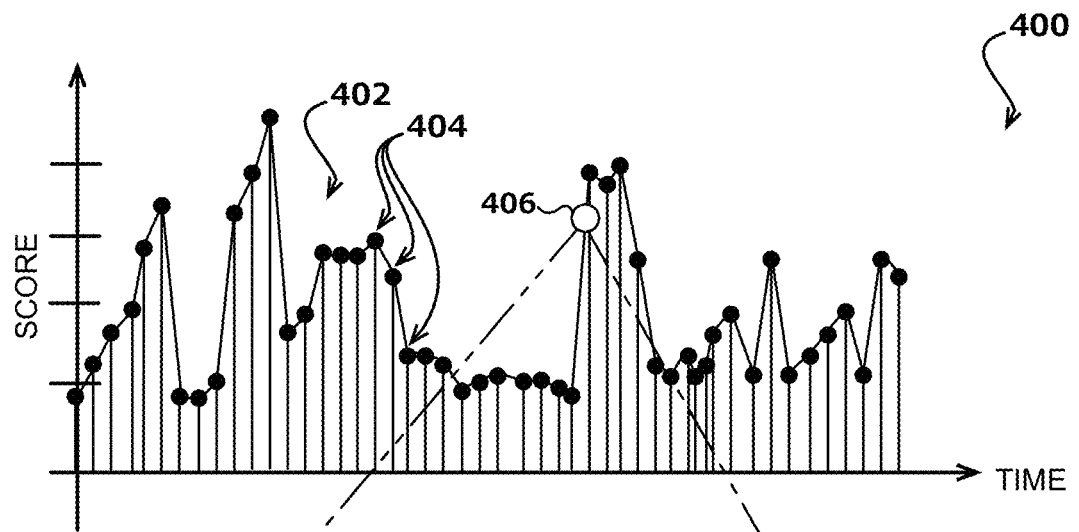
FIGS. 4A, 4B, and 4C illustrate examples of various visualizations that can be presented in accordance with an embodiment.
Figure 4B:
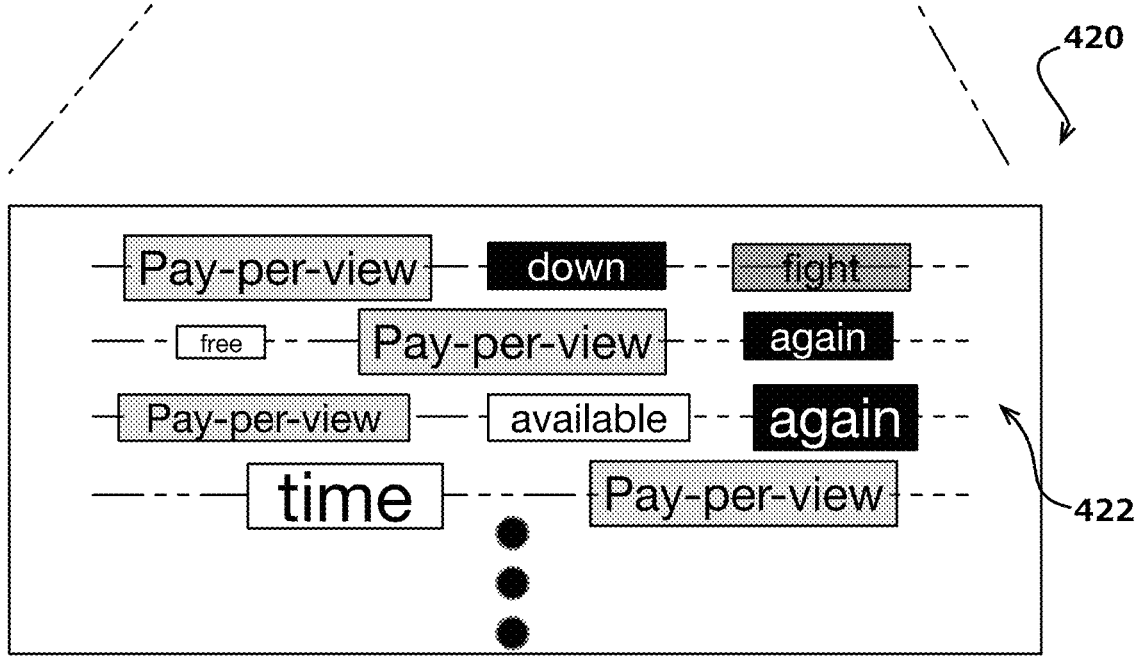
Figure 4C:

FIGS. 4A, 4B, and 4C illustrate various visualizations that can that be presented in accordance with various embodiments. As described, messages between customers and customer support agents can be analyzed to identify and alert a company of problematic issues raised by customers, detect trends of behavior/issues from customer support messages, provide business insights based on the problematic issues and trends, etc. An alert can be presented with, for example, the messages that triggered the alert, business metrics such as a volume of messages causing the alert or a cost for customer support agents to respond to the volume of messages, a graphical representation of textual data, an organized display of textual data, a word cloud For example, example 400 of FIG. 4A illustrates graph 402 that illustrates a graphical representation of trends of behavior determined from messages between customers and customer support agents. Graph 402 is similar to graph 302 of FIG. 3. In this example, the x-axis represents time and the y-axis represents a level of confidence. The x-axis can be represented in a number of different time periods, including, for example, time periods of minutes, hours, days, weeks, months, years, etc. The y-axis can be represented as a number, e.g., a number between zero and one, a number between zero and 100, a percentage, etc. Each number corresponds to a representative confidence score that represents the likelihood that for a particular time interval an event occurred.

Dots 404 represent spikes or trends of behavior for a particular time period. The higher the score for a dot, the more likely an event occurred. As described herein, a trained model (e.g., logistic regression model) can be used to determine a score (e.g., representative confidence score) for each time period, and a trend detection technique can be utilized to determine whether a score for a current time period is associated with an anomalous event. In the situation the score for the current time period is associated with an anomalous event, an alert or other such notification can be triggered. In accordance with an embodiment, in the situation a dot for a time period corresponding to a low score is selected, the messages for that time period are typically unintelligible or meaningless. In the situation a dot for a time period corresponding to a high score is selected, the messages for that time period typically correspond to an event or trend of behavior in the customer support messages.

For example, FIG. 4B illustrates example 420 of a listing of messages 422 associated with dot 406. The messages include text that corresponds to an event and an issue associated with the event. In this example, the event is a pay-per-view show and the issue is that the pay-per-view show is down. In certain embodiments, the words of the messages can be emphasized. For example, the size, color, font, etc. of the words can be adjusted based on a word's contribution to the confidence score, frequency of use, and the like. For example, each word in a message, once analyzed using a trained model, may be associated with a model coefficient. The model coefficient can be used to determine, for example, the size, color, font, etc. of the words, as shown in FIG. 4B where the size of the words, background color of the words, etc. is adjusted.

As shown in example 440 of FIG. 4C, a visual representation of the words can be displayed, such as word cloud 442. A "word cloud" or "tag cloud" is commonly used to refer to a visualization of text in a "cloud" of text. A word cloud may display distinct words of a set of messages. Often, a word cloud gives greater prominence to important words. At a glance, a viewer of a word cloud is able to see what the "key words" (the most prominent) were in any particular set of messages. A work cloud can also be used to summarize the messages for a period of time. This provides a benefit to an appropriate person who would be able to glance at the word cloud and glean what words triggered an alert for a particular time period. It also may be beneficial for the person to review word clouds for past time periods to have a better understanding of behavior trends. In accordance with various embodiments, a word cloud can quickly convey relative importance of words by displaying relatively important words larger than relatively unimportant words. The location and color can also be used to convey relative importance of words.

In various embodiments, in addition to, or instead of textual representations, business metrics associated can be generated and presented. The business metrics can be associated with sets of messages, such as the messages associated with a dot or other period of time, messages associated with confidence scores, representative confidence scores, etc. The business metrics or other relevant information can be any information beneficial or useful to a company, person, or entity. For example, business metrics can include the cost to respond to customer support request for a period of time, the number of messages to trigger an alert, the number of customer support agents used to respond to customer support requests for a period of time, the total amount of time to respond to the customers support requests, etc.

Figure 5:
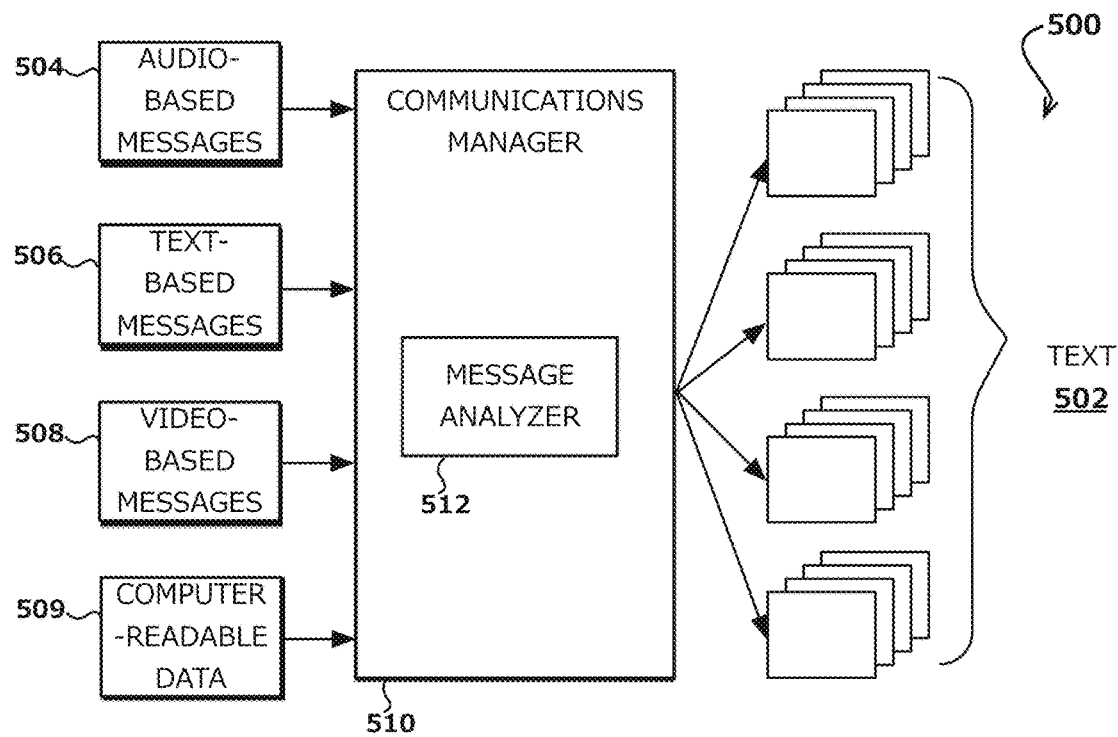
FIG. 5 illustrates an example of processing customer support messages in accordance with various embodiments.

As described herein, text used to train a model (e.g., prediction model) can be obtained from messages between customers and customer support agents. FIG. 5 illustrates an example 500 of processing customer support messages to obtain the text, in accordance with various embodiments. In this example, text 502 from customer support messages between customers and customer support agents during customer support sessions can be obtained using text extraction techniques, speech recognition techniques, and the like. Text 502 can be associated with a timestamp for when the message for which the text was determined was received, information linking or otherwise mapping the text to the message, information identifying the source of the message, and the like.

In accordance with an embodiment, in example 500 of FIG. 5, audio-based messages 504, text-based messages 506, video-based messages 508, and computer-readable data 509 are received at communications manager 510. Communications manager 510 is operable to process the messages to determine, for example, text and other information for each of the messages, such as a timestamp, a source, etc. In certain embodiments, communications manager 510 can separate or otherwise split messages into one or more sets of messages. The sets can be based on one or more criteria. For example, the sets can be based on when a message was received. In an example, this can include a set of messages including messages received during a period of time, a set of messages including messages received before the period of time, a set of messages including messages received after the period of time, etc. Communications manager 510 in various embodiments can flag or otherwise group messages to be included in a holdout set of messages, where messages in the holdout set are disjoint from messages in the other sets.

In an embodiment, an audio-based message includes messages with audio data. Examples of audio-based messages include recorded telephone calls, a voice message containing audio of a person's voice, voice texts, voicemails, etc. A text-based message includes messages with text. Examples of text-based messages include text messages, emails, chat messages, letters, signs, etc. A video-based message includes messages with video data. Examples of video-based messages include recorded video calls, video messages, etc. Computer-readable data can include data that can be processed by a computer. The data can be structured or unstructured. Computer-readable data can include data communicated between electronic devices such as computer/server communication logs, computer instructions or code, backend logs, communication stream between computers, etc.

Communications manager 510 can include message analyzer 512. Message analyzer 512 can be configured to analyze the messages to determine text for each message, as well as determine or otherwise maintain information about the messages (e.g., timestamp, source, etc.) For example, message analyzer 512 or another appropriate component can use a text extraction technique to extract the text from text-based messages or a speech recognition technique to convert audio-based and video-based messages to text. It should be noted that any one of a number of text extraction techniques and speech recognition techniques can be utilized in accordance with embodiments described herein.

Figure 6:
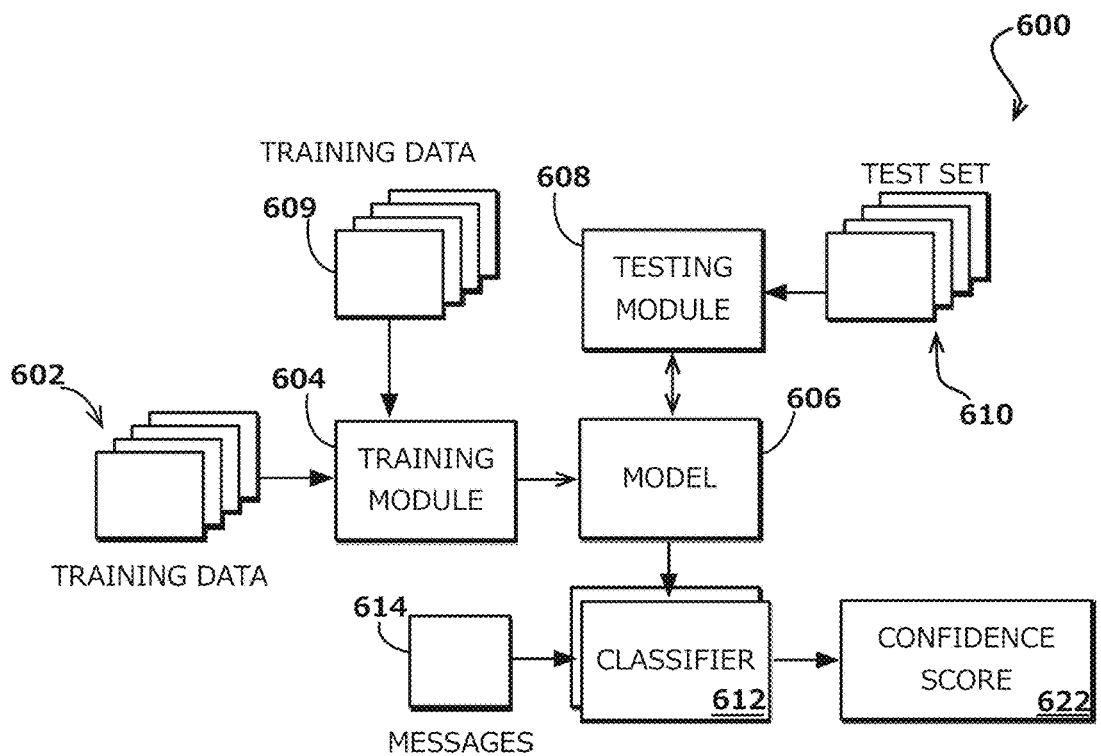
FIG. 6 illustrates an example classification pipeline that can be utilized in accordance with various embodiments.

Once the messages are obtained and the text determined, the text from the customer support messages can be used to train a model to predict whether a message is received before a particular time period or during the time period. For example, example 600 of FIG. 6 illustrates an example classification pipeline that can be utilized in accordance with various embodiments. In this example, messages are obtained that can be used to train model 606. Training data 602 and 609 can include customer support session data (e.g., times and text of messages exchanged between customers and customer support agents, etc.) or other communications session data between customers and customer support agents during customer support sessions. As described, the messages can include call transcripts, text conversation transcripts, timestamp records, etc.

In order to function as training data for one or more models (e.g., a logistic regression model or other machine learning-based model), at least some of the customer support messages can include (or be associated with) data that indicates a label, type, or classification of the customer support messages. The classifications in at least some embodiments can be selected from a set of classifications, or sub-classifications used to identify various types of messages, customer support requests, timing information, etc. For example, for a period of time, training data 602 can include messages received before the period of time and training data 609 can include messages received during the period of time.

The training data can be labeled using one of any number of approaches. For example, the training data can be labeled using a feature extractor to extract features of the training data, such as timestamp, and a category model to perform the classification of the training data based on the extracted features. A feature extractor can extract, for example, the timestamp from each message. A category model can label each message based on the timestamp and the period of time. The category model may be trained, for example, on data from a company database that has been annotated by human experts. The output of the category model can be, for example, a one-of-k vector (where one element of the vector is true, or 1 and the remaining values are false or 0) indicating which category the data belongs to (of k possible categories). For example, the feature extractor can extract the timestamp for each message. The category model can process the timestamp and categorize the message as being received before the time period or during the time period. In another example, the timestamp for each message can be compared to the time period. Messages associated with a timestamp before the time period can be labeled one. Messages associated with a timestamp during the time period can be labeled zero.

In some embodiments, a portion of the training set will be retained as testing set 610 to use to test the accuracy of the trained model.

In this example, the training data is accessible to a training module 604 which can feed the data to model 606 (e.g., a machine learning-based model) to train the network. Model 606 can include, for example, one of a logistic regression, Naïve Baye, random forest, neural network, or support vector machines (SVMs), etc.

The classification data can be provided to the model so the model can learn features associated with the customer support messages. The network can then learn various combinations or relations of features of the customer support messages, such that when a message is processed with the trained model, the model can recognize the features and output the appropriate confidence score for the message. In an embodiment, the confidence score can quantify whether a message is received before the time period or during the time period.

In certain embodiments, once at least the initial training has completed, a testing module 608 can utilize the testing set 610 to test the trained model. Since the testing data already includes classification data, such as data operable to label, identify, or otherwise indicate ground truth, the classifications and predictions generated by the model can be compared against that data to determine the accuracy of the model, both overall and for different categories of customer support requests. In certain embodiments, the testing data can also be used to train the model further. The results can be analyzed and if the results are acceptable, such as where the accuracy at least meets a minimum accuracy threshold for some or all of the classifications and predictions, the model can be provided to classifier 612 that is able to process customer support messages 614, and generate confidence score 622.

In some embodiments, the training data 602 and 609 can be used as training data for one of a logistic regression, Naïve Baye, random forest, neural network, or support vector machines (SVMs), convolutional recurrent neural network, deep neural network, or other types of neural networks or models, and/or combination of any of the above models, stacked models and heuristic rules. Various other approaches can be used as well as discussed and suggested elsewhere herein.

Figure 7:
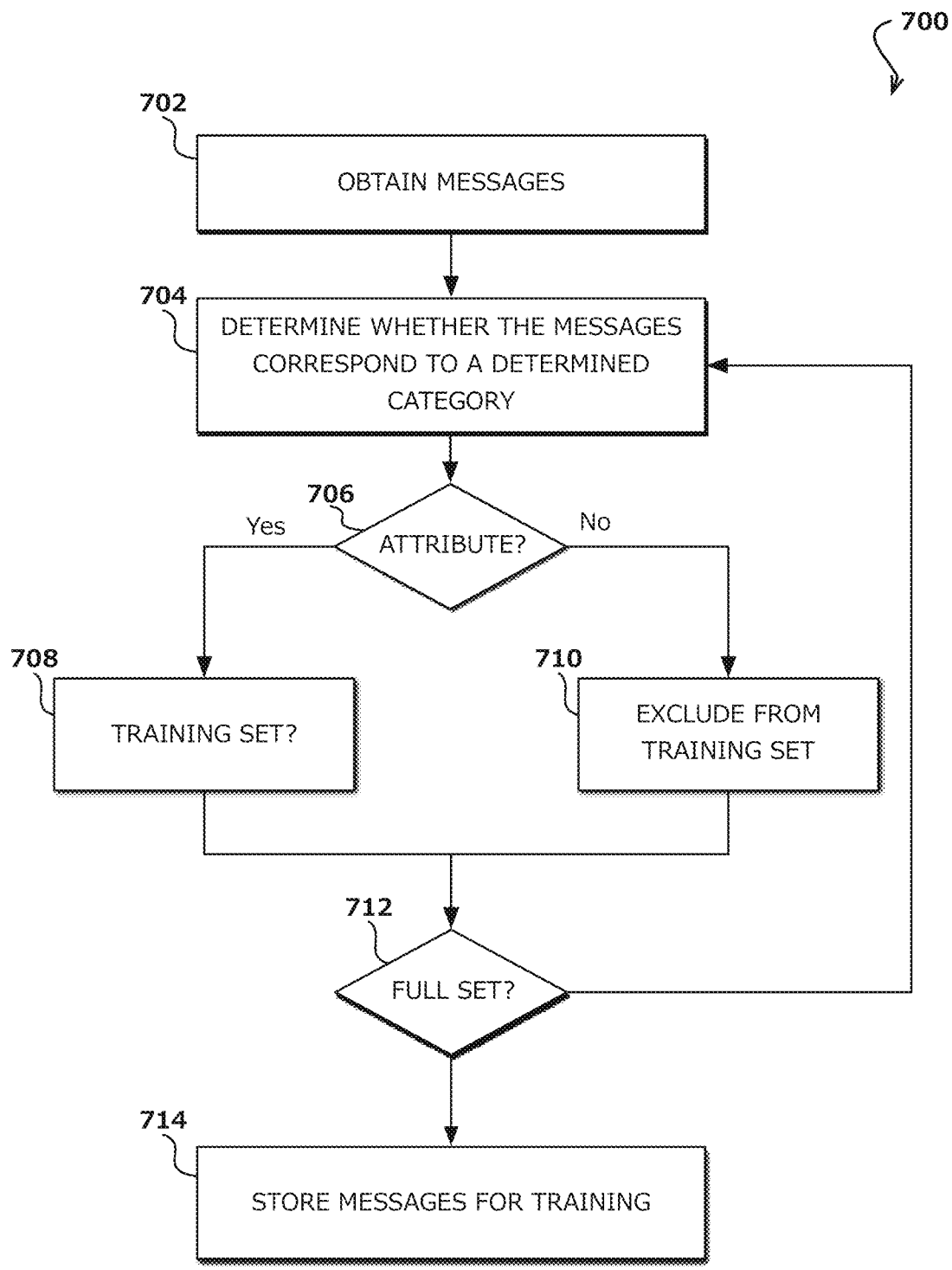
FIG. 7 illustrates an example process for determining training data that can be utilized in accordance with various embodiments.

FIG. 7 illustrates an example process 700 for determining training data that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, customer support session data (e.g., times and text of messages exchanged between customers and customer support agents) can be obtained 702 for analysis. The session data can be obtained from, for example, company records, customer support, a stream of customer support messages, computer/server communication logs, computer-readable data between one or more computers (e.g., message logs, instructions, code, etc.), or otherwise obtained. In certain embodiments, the training data can be from one or more data stores maintained directly or indirectly by a customer support service provider, resource provider, or a third-party, or from multiple sources, among other such options.

A timestamp associated with each message (or other information associated with each messages) can be used to determine 704 whether a type of classification of the messages corresponds to a category and includes particular attributes, or types of attributes, for which a model (e.g., logistic regression, neural network, or other machine learning algorithm) can be trained. For example, using a timestamp for each message, it can be determined whether a message occurred before, during, or after a selected period of time, and, e.g., whether that message includes text, a certain amount of text, a type of text, etc.

If it is determined 706 that a message exhibits the attribute (e.g., time) for a particular category (e.g., received before, during, after a period of time), then that message can be added 708 to the training set. In an embodiment, the training set can include different sets of messages. For example, the training set can include a set of messages received before a time period and a set of messages received during the time. If not, that message can be excluded 710 from the training set. As mentioned elsewhere herein, in at least some embodiments, some of the messages may be instead added to a testing set, a holdout set, or not added to any set but may have the attribute classification associated therewith. Messages in the holdout set can include messages received during the time period and disjoint from the other messages in the training set.

If it is determined 712 that a full training set has been obtained, using any appropriate criterion as discussed or suggested herein, such as a threshold number of messages for a period of time, then the training set generation can complete, and the messages can be stored 714 for training and other purposes. Otherwise, the process can continue until a full set is obtained, all of the relevant session data is analyzed, or another stop condition is satisfied.

Figure 8:
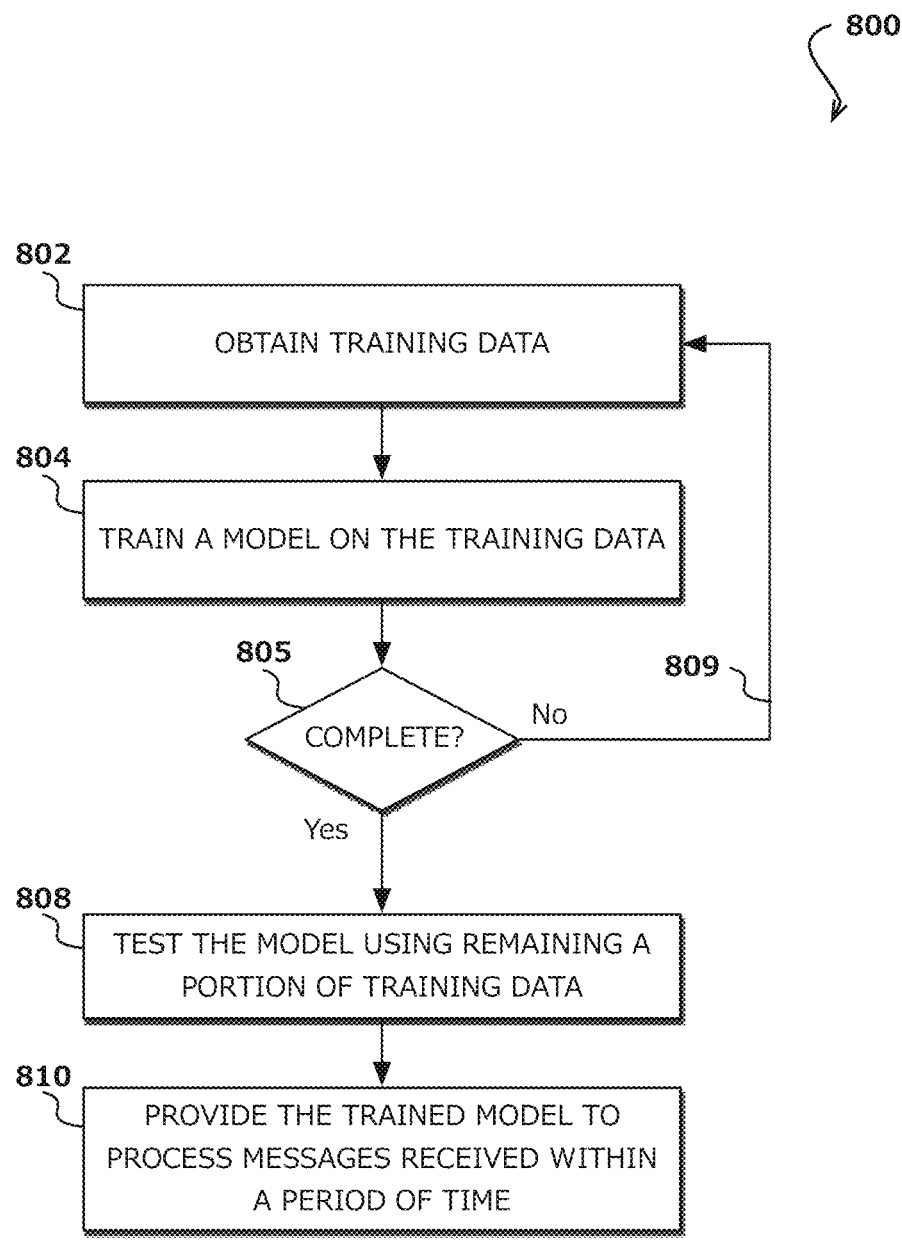
FIG. 8 illustrates an example process for training a model that can be utilized in accordance with various embodiments.

FIG. 8 illustrates an example process 800 for training a prediction model that can be utilized in accordance with various embodiments. Once the training data is obtained 802, the training data can be provided as input to a model training process. The training data can include, for example, customer support session data (e.g., times and text of messages exchanged between the customer and the customer support agent, etc.) or other communications session data between customers and customer support agents and data that indicates a type or classification for a specific category for a customer support request, timestamp records, text of messages exchanged between customers and customer support agents, and the like. As described, the type or classification for a specific category can include messages received before, during, or after a particular time period. Thus, according to various embodiments, the training data can include a set of messages received before a time period and a set of messages received during the time.

In the example of logistic regression, or other machine learning-based model, the model can be trained 804 on the training data to predict whether a message is received before a particular time period or during the time period. For example, the model can learn various combinations or relations of features of message data such that when messages are processed with the trained model, the trained model can recognize the features and output prediction information, including, for example, a prediction score or other such score, although various other outputs can be utilized as well within the scope of the various embodiments.

If it is determined 805 that a stop condition has been met so that training should be completed, such as by processing the entire training set, then the trained model can be provided to process, for example, messages for a particular period of time. As discussed herein, the model might first go through a process to test 808 using at least some of the training classified with the attribute type from earlier steps of the process. If the training is not complete, then the training process can continue 809 until a trained model is obtained. Thereafter, the trained model can be provided 810 to process messages associated with a particular period of time to predict whether a message is received before a particular time period or during the time period.

Figure 9:
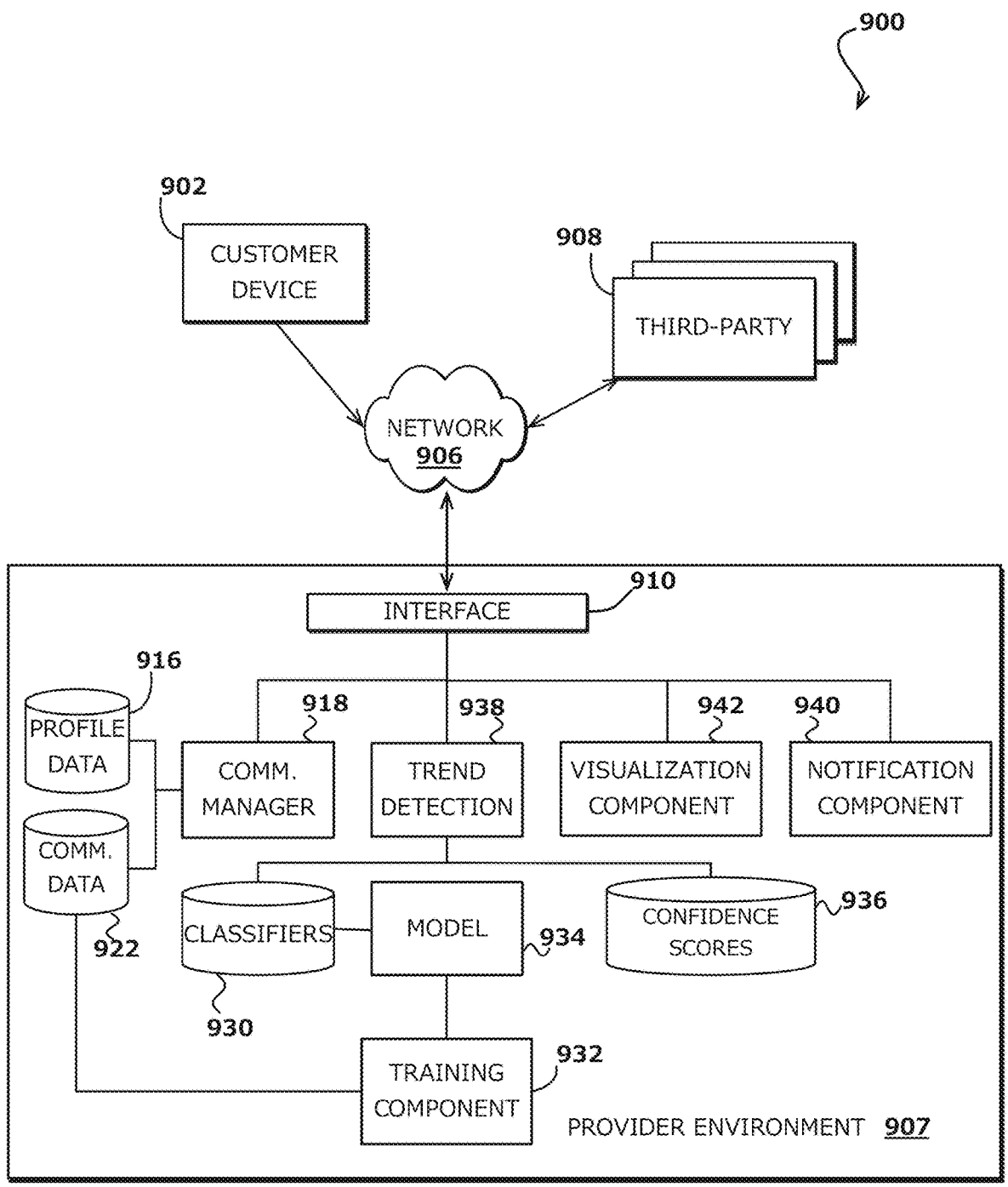
FIG. 9 illustrates an example environment in which aspects of the various embodiments can be implemented.

FIG. 9 illustrates an example environment 900 in which aspects of the various embodiments can be implemented. In this example, users (e.g., a customer of a company) can utilize an application or interface, such as a browser, executing on customer device 902 to customer support over at least one network 906. The messages can be for support during a customer support session, and the messages can be between a customer and a company, or entity associated with the company.

The customer device 902 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

The messages can be communicated using any appropriate technique, such as typing or speaking a message to an app running on a customer device (e.g., an app of the company or a third-party app created for processing customer support requests), typing or speaking a message on a web page, sending a text message, sending an email, etc. As used herein, a text message includes any message sent as text including but not limited to a message sent using SMS (short message service) or a special-purpose application (e.g., Facebook messenger, Apple iMessage, Google Hangouts, or WhatsApp).

In this example, customer device 902 is in communication with a resource provider 907 via the at least one network 906. The at least one network can include a wired and/or wireless network, as may include the Internet, a cellular network, a local area network (LAN), an Ethernet, an Intranet, and the like. The customer device 902 may have varied local computing resources, such as may include central processing units and architectures, memory, mass storage, graphics processing units, communication network availability and bandwidth, etc.

Resource provider 907 can provide customer support services for various services. These services can include, for example, payment services, technical support services, human resource services, among other such services. In certain embodiments, provider 907 can be an intermediary between a customer of a company and a company, such as third-party 908. For example, third-party 908 can utilize resource provider 907 to provide customer support to its customers to improve the customer support experience and to reduce overall customer support costs. For example, third-party 908 may find it more cost effective to use load management services of resource provider 907 than to implement its own load management services. In an example, third-party 908 can utilize provider 907 to provide customer support services to any number of companies as well as customers of those companies. This can include, for example, automatically responding to customer support requests, connecting a customer with a customer service representative (CSR), customer support agent, etc., selecting a CSR to process a customer support request, establishing customer support sessions between customers and CSRs, providing resources to CSRs to process customer support requests, etc. In another example, third-party 908 may utilize the services of a fourth-party company in providing support services to their customers, companies, and customers of those companies. In yet another example, third-party 908 can utilize provider 907 to detect anomalous events and trends of behavior.

Messages and information associated with the messages can be received to an interface and/or networking layer 910 of the resource provider 907. The interface and/or networking layer can include any of a number of components known or used for such purposes, as may include one or more routers, switches, load balancers, Web servers, application programming interfaces (APIs), and the like.

The messages and associated information can be stored in communications data store 922 and as well as information associated with the customer in in profile data store 916 until such messages is ready to be processed. The information may include any relevant information, such as text of a message from the customer, information about a customer (e.g., an IP address, a customer ID, or authentication credentials), or information about a company from which the customer is seeking customer support (e.g., a company ID). The information may be received directly from a customer device or may be received via a server of a company from whom the customer is requesting support. In some embodiments, some information may be received directly from the customer device and some information may be received from a server of the company. In the situation where such information is not available, the system can request the information or other information including, for example, information about the customer.

The message and information associated with the message can be directed to communications manager 918 or other appropriate component. Communications manager 918 is operable to process messages to determine, for example, text and other information for each of the messages, such as a timestamp, a source, etc. In certain embodiments, communications manager 918 can separate or otherwise split messages into one or more sets of messages. The sets can be based on filtering criteria. For example, the sets can be based on when a message was received. In an example, this can include a set of messages including messages received during a period of time, a set of messages including messages received before the period of time, a set of messages including messages received after the period of time, etc. Communications manager 918 in various embodiments can flag messages to be included in a holdout set, where messages in the holdout set are disjoint from messages in the other sets. The messages and associated information can be stored in communications data store 922 or other appropriate data store.

Once the messages are obtained and the text determined, the text from the customer support messages can be used to train a model to predict whether a message is received before a particular time period or during the time period, for example, training component 932, model 934, and classifiers data store 930. For example, training component 932 can obtain messages from communication data store 922 to be used as training data. The messages can be organized into sets. In an example, this can include a set of messages including messages received during a period of time, a set of messages including messages received before the period of time, a set of messages including messages received after the period of time, etc.

For each one of a plurality of periods of time, a model (e.g., a prediction model) can be trained. Each model can be trained on messages that correspond to each models' period of time, and the trained models can be stored in classifier data store 930.

Once a model for a period of time is trained, the model can be used to evaluate each message in a holdout set of messages for the period of time to obtain a set of confidence scores corresponding to the holdout set of messages. The set of confidence scores can be processed to determine a representative confidence score for the time period based on the set of confidence scores. The representative confidence score can be stored in confidence score data store 936 with representative confidence scores from a plurality of prediction models trained over a plurality of previous time periods.

For a selected time period, trend detection component 938 can apply a model (e.g., trend detection model) to the representative confidence scores for periods of time before the selected time period to determine whether the representative confidence score for the selected time period is associated with an anomalous event.

In the situation an anomalous event is detected, notification component 940 can generate and present an alert for the anomalous event to an appropriate entity. Visualization component 942 can present business metrics associated with the alert, a graphical representation of textual data, an organized display of textual data, a word cloud, a list of messages, and the like.

In accordance with various embodiments, additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the system. For example, the system can include various modules and components combined on a single device, multiple instances of a single module or component, etc. In one specific, non-limiting embodiment, communications manager 918, trend detection component 938, and visualization component 942, can execute on one device and training component 932 can execute on another device, and notification component 940 can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 10:
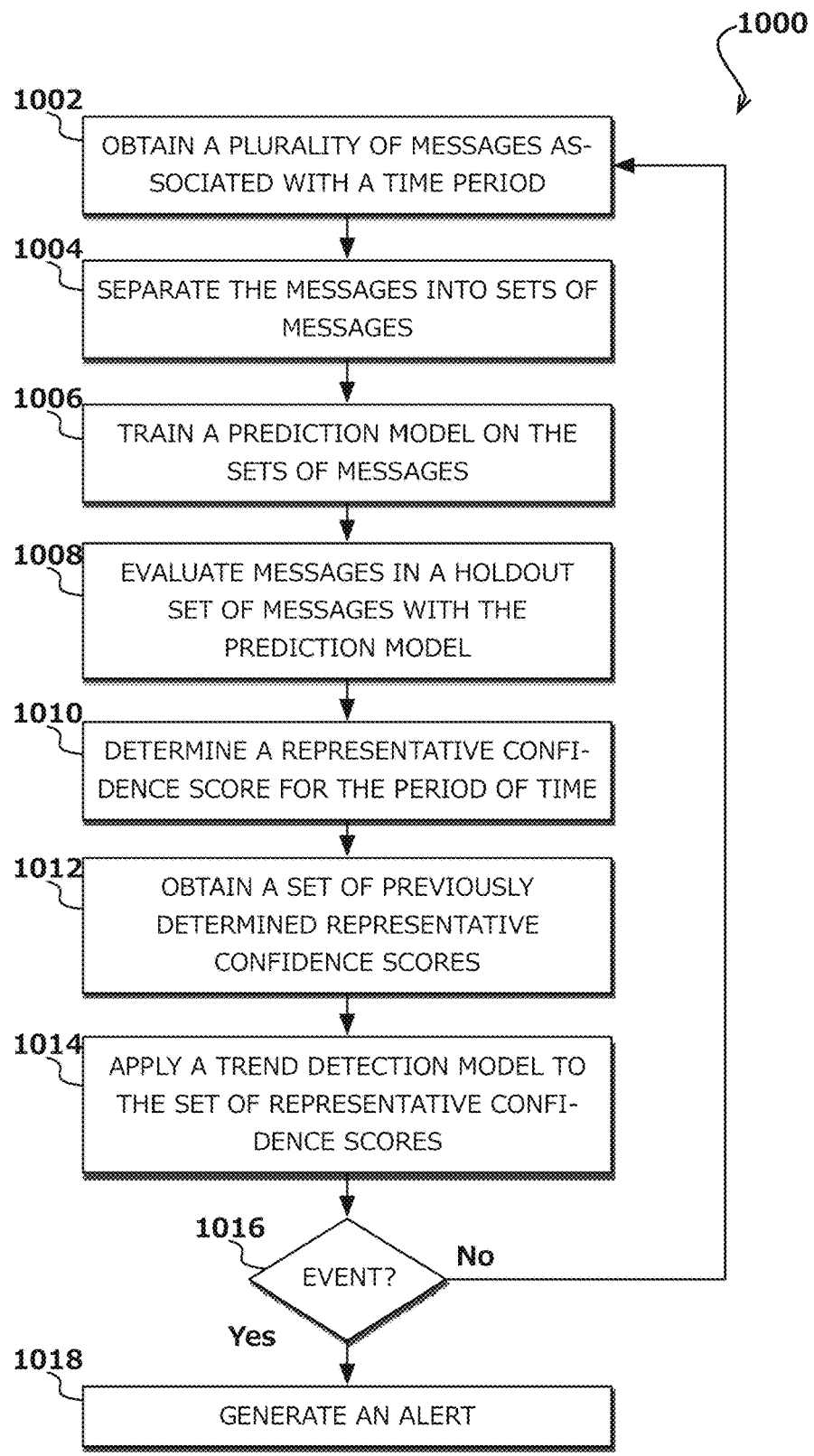
FIG. 10 illustrates an example process for detecting anomalous events in accordance with various embodiments.

FIG. 10 illustrates an example process 1000 for detecting anomalous events in accordance with various embodiments. In this example, a plurality of messages is obtained 1002. The messages can be obtained from, for example, company records, customer support logs, a stream of customer support messages, computer/server communication logs, computer-readable data between computers (e.g., message logs, instructions, code, etc.), or otherwise obtained. The messages can be separated 1004 or otherwise split into sets of messages. For example, a first set of messages, a second set of messages, and a holdout set of messages, wherein the first set of messages includes messages received before a time period, the second set of messages includes messages received during the time period, and the holdout set of messages includes messages received during the time period and disjoint from the second set of messages.

A prediction model 1006 (e.g., a logistic regression model) is trained on the first set of messages and the second set of messages to predict whether a message is received before a time period or during the time period. For example, the prediction model can be used to evaluate 1008 each message in the holdout set of messages to obtain a set of confidence scores corresponding to the holdout set of messages. The set of confidence scores can be processed to determine 1010 a representative confidence score for the time period based on the set of confidence scores. A set of previously determined representative confidence scores from a plurality of prediction models trained over a plurality of previous time periods can be obtained 1012.

A trend detection model can be applied 1014 to the set of representative confidence scores to determine 1016 whether the representative confidence score for the time period is associated with an anomalous event. In the situation where the representative confidence score is not associated with an anomalous event, the process can continue 1017 for the next period of time. In the situation where the representative confidence score is associated with an anomalous event, an alert for the anomalous event can be generated 1018 and presented to an appropriate entity. The alert can be presented with, for example, the messages that triggered the alert, business metrics such as a volume of messages causing the alert or a cost for customer support agents to respond to the volume of messages, a graphical representation of textual data, an organized display of textual data, a word cloud, among other such information.

Figure 11:
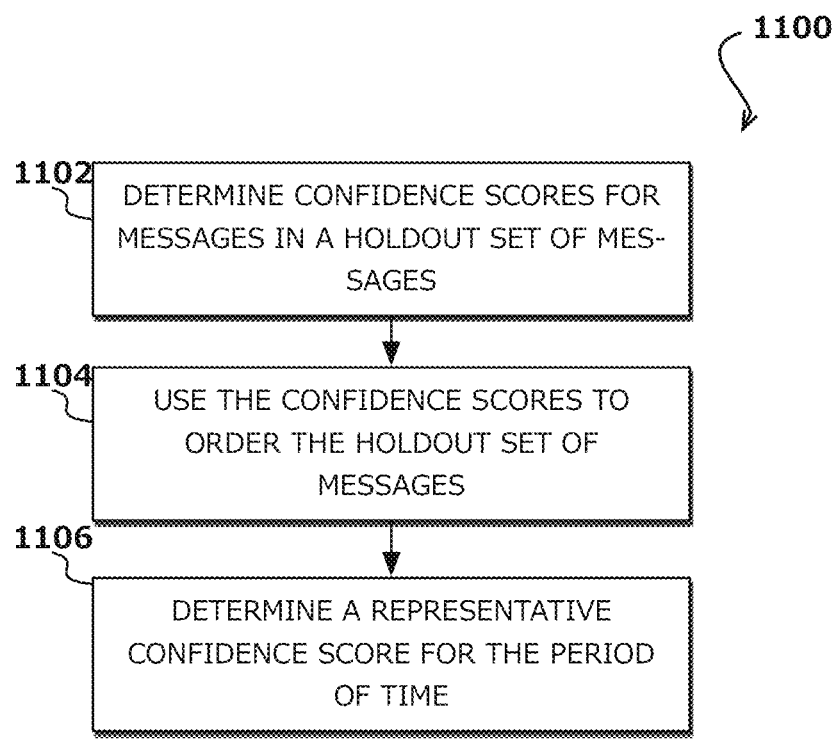
FIG. 11 illustrates an example process for determining scores that can be utilized in accordance with various embodiments.

FIG. 11 illustrates an example process 1100 for detecting anomalous events in accordance with various embodiments. In this example, confidence scores for messages in a holdout set of messages is determined 1102. This can include, for example, evaluating a prediction model on each message in the holdout set of messages. The confidence scores can be used 1104 to order the holdout set of messages. For example, the messages can be ordered from messages having a highest confidence score to messages having a lowest confidence score. A representative confidence score for a period of time associated with the holdout set of messages can be determined 1106 using the order of the holdout set of messages. For example, the representative confidence score for the time period can be the confidence score corresponding to a confidence score threshold. In an example, the representative confidence score can be the confidence score corresponding to the $95_{th}$ percentile confidence score.

In certain embodiments, the representative confidence score may be an average of representative confidence scores. For example, a plurality of messages associated with a period of time can be split into a plurality of groups of first sets of messages, second sets of messages, and holdout sets of messages. A representative confidence score can be determined for each holdout set of messages of the plurality of groups to obtain a set of representative confidence scores, and the representative confidence score for the period of time can correspond to one of the average of the scores or the median representative confidence score of the set of representative confidence scores. In yet another example, representative confidence scores from the set of representative confidence scores that meet a threshold representative confidence score can be selected, and the average of the selected representative confidence scores can correspond to the representative confidence score for the period of time.

Figure 12:
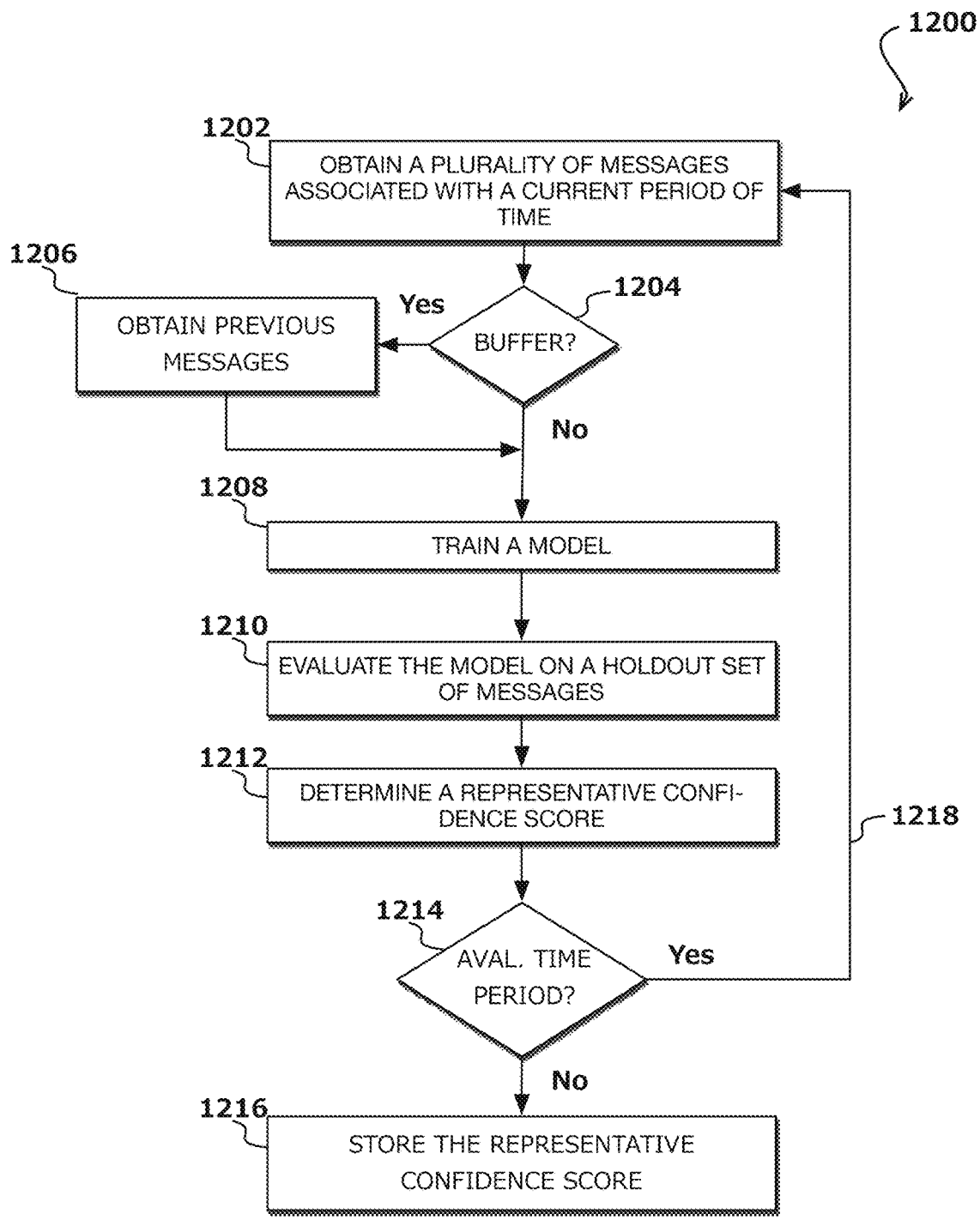
FIG. 12 illustrates an example process for determining scores that can be utilized alternate embodiments.

FIG. 12 illustrates an example process 1200 for detecting anomalous events in accordance with various embodiments. In this example, a plurality of messages is obtained 1202. The plurality of messages can be associated with a plurality of time periods. If it is determined 1204 that the number of messages for a current time period has not been received, using any appropriate criterion as discussed or suggested herein, such as a threshold number of messages, then messages from a previous period of time can be obtained 1206 or otherwise used or buffered with messages of the current time period. The number of messages obtained from the previous time period can be equal or more than then a difference between the threshold number of messages and the number of messages for the current time period. Otherwise, a model (e.g., a logistic regression model) can be trained 1208 on a first and second set of messages for the current time period. The first set of messages can include messages received before the current time period and the second set of messages can include messages received during the current time period. The model can be evaluated 1210 on a holdout set of messages associated with the current time period to obtain a set of confidence scores corresponding to the holdout set of messages. A representative confidence score for the current time period can be determined 1212 using the set of confidence scores in accordance with embodiments described herein. A determination can be made 1214 whether a new model is to be trained for an available time period. If it is determined that there are no remaining time periods, then the process can complete, and the representative confidence scores can be stored 1216 for trend detection and other purposes. In certain embodiments, the model for each time period can be stored for use in one or more other purposes. Otherwise, if it is determined that a time period remains, the process can continue 1218 until a model is trained and a representative confidence score determined for the remaining time periods or until another stop condition is satisfied.

Figure 13:
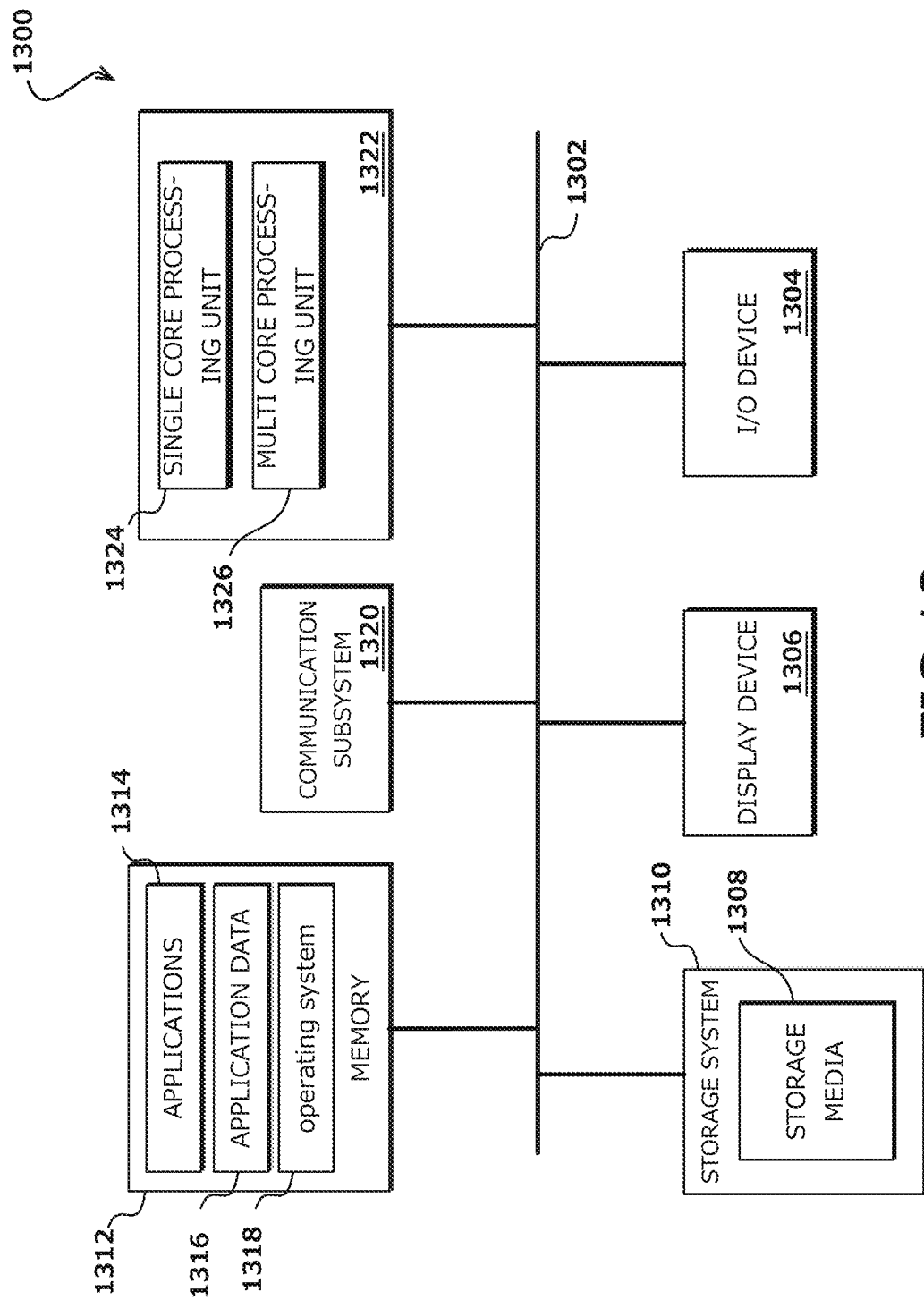
FIG. 13 illustrates an example configuration of components of a device.

FIG. 13 illustrates a set of basic components of an electronic computing device 1300, such as computing device 104 in FIG. 1A. In various embodiments, computer device 1300 may be used to implement any of the systems, devices, or methods described herein. In some embodiments, computer device 1300 may correspond to any of the various devices described herein, including, but not limited, to mobile devices, tablet computing devices, wearable devices, personal or laptop computers, vehicle-based computing devices, or other devices or systems described herein. As shown in FIG. 13, computer device 1300 can include various subsystems connected by a bus 1302. The subsystems may include an I/O device subsystem 1304, a display device subsystem 1306, and a storage subsystem 1310 including one or more computer-readable storage media 1308. The subsystems may also include a memory subsystem 1312, a communication subsystem 1320, and a processing subsystem 1322.

In device 1300, bus 1302 facilitates communication between the various subsystems. Although a single bus 1302 is shown, alternative bus configurations may also be used. Bus 1302 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1302 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1304 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1304 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer device 1300 may include a display device subsystem 1306. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1306 may include a controller and/or interface for controlling and/or communicating with an external display, such as any of the above-mentioned display technologies.

As shown in FIG. 13, device 1300 may include storage subsystem 1310 including various computer-readable storage media 1308, such as hard disk drives, solid-state drives (including RAM-based and/or flash-based SSDs), or other storage devices. In various embodiments, computer-readable storage media 1308 can be configured to store software, including programs, code, or other instructions, that is executable by a processor to provide the functionality described herein. For example, the instructions, when executed, can enable a computing device to detect and generate alerts for anomalous events in accordance with the present disclosure may be embodied on a computer-readable medium. This may include separating the plurality of messages into a first set of messages, a second set of messages, and a holdout set of messages, wherein the first set of messages includes messages received before a time period, the second set of messages includes messages received during the time period, and the holdout set of messages includes messages received during the time period and disjoint from the second set of messages; training a prediction model on the first set of messages and the second set of messages to predict whether a message is received before the time period or during the time period; evaluating the prediction model on each message in the holdout set of messages to obtain a set of confidence scores corresponding to the holdout set of messages; determining a representative confidence score for the time period based on the set of confidence scores; obtaining a plurality of previous representative confidence scores from a plurality of prediction models trained over a plurality of previous time periods; applying a model to the plurality of previous representative confidence scores to determine that the representative confidence score for the time period is associated with an anomalous event; generating an alert for the anomalous event; using the set of confidence scores corresponding to the holdout set of messages to select a set of messages; and presenting the set of messages.

In some embodiments, storage system 1310 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1310 can include a media reader, card reader, or other storage interfaces to communicate with one or more external and/or removable storage devices. In various embodiments, computer-readable storage media 1308 can include any appropriate storage medium or combination of storage media. For example, computer-readable storage media 1308 can include, but is not limited to, any one or more of random access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1312 can include various types of memory, including RAM, ROM, flash memory, or other memory. Memory 1312 can include SRAM (static RAM) or DRAM (dynamic RAM). In some embodiments, memory 1312 can include a BIOS (basic input/output system) or other firmware configured to manage initialization of various components during, e.g., startup. As shown in FIG. 13, memory 1312 can include applications 1314 and application data 1316. Applications 1314 may include programs, code, or other instructions, that can be executed by a processor. Applications 1314 can include various applications such as browser clients, campaign management applications, data management applications, and any other application. Application data 1316 can include any data produced and/or consumed by applications 1314. Memory 1312 can additionally include operating system 1318, such as macOS®, Windows®, Linux®, various UNIX® or UNIX- or Linux-based operating systems, or other operating systems.

Device 1300 can also include a communication subsystem 1320 configured to facilitate communication between device 1300 and various external computer systems and/or networks (such as the Internet, a local area network (LAN), a wide area network (WAN), a mobile network, or any other network). Communication subsystem 1320 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1320 can include hardware and/or software components to communicate with satellite-based or ground-based location services, such as GPS (global positioning system). In some embodiments, communication subsystem 1320 may include, or interface with, various hardware or software sensors. The sensors may be configured to provide continuous or and/or periodic data or data streams to a computer system through communication subsystem 1320

As shown in FIG. 13, processing system 1322 can include one or more processors or other devices operable to control computing device 1300. Such processors can include single-core processors 1324, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1322, such as processors 1324 and 1326, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computer-implemented method, comprising:
   obtaining a plurality of messages associated with a current time period, individual messages being associated with a timestamp within the current time period;
   determining that a total number of the plurality of messages received within the current time period is below a threshold number of messages;
   buffering additional messages from a previous period of time with the plurality of messages, a number of the additional messages obtained satisfying a difference between the threshold number of messages and the total number of the plurality of messages;
   separating a combination of the plurality of messages and the additional messages into a first set of messages, a second set of messages, and a holdout set of messages based on respective timestamps, wherein the first set of messages includes a first portion of the combination of the plurality of messages and the additional messages received before the current time period, the second set of messages includes a second portion of the combination of the plurality of messages and the additional messages received during the current time period, and the holdout set of messages includes a third portion of the combination of the plurality of messages and the additional messages received during the current time period and disjoint from the second set of messages;

training a prediction model on the first set of messages and the second set of messages to predict whether a message is received before the current time period or during the current time period;

evaluating the prediction model on each message in the holdout set of messages to generate a set of confidence scores corresponding to the holdout set of messages, wherein a confidence score quantifies a likelihood a message is received before the current time period or during the current time period;

determining a representative confidence score for the current time period based on the set of confidence scores;

obtaining a plurality of previous representative confidence scores from a plurality of prediction models trained over a plurality of previous time periods;

applying a model to the plurality of previous representative confidence scores to determine that the representative confidence score for the current time period is associated with an anomalous event;

generating an alert for the anomalous event;

using the set of confidence scores corresponding to the holdout set of messages to select a set of messages; and presenting the set of messages.

2. The computer-implemented method of claim 1, further comprising:

using the set of confidence scores to order the holdout set of messages; and determining the representative confidence score using the order of the holdout set of messages.

3. The computer-implemented method of claim 1, further comprising:

splitting the plurality of messages into a plurality of groups of first sets of messages, second sets of messages, and holdout sets of messages;

determining a representative confidence score for each holdout set of messages of the plurality of groups to obtain a set of representative confidence scores; and averaging the set of representative confidence scores to determine the representative confidence score.

4. The computer-implemented method of claim 1, wherein the model is a change point detection model.

5. The computer-implemented method of claim 1, wherein the prediction model is one of a logistic regression, Naïve Baye, random forest, neural network, or support vector machines (SVMs).

6. The computer-implemented method of claim 1, wherein presenting the set of messages further includes:

presenting business metrics associated with the holdout set of messages, wherein the business metrics include one of a volume of messages causing the alert or a cost for customer support agents to respond to the volume of messages.

7. The computer-implemented method of claim 1, wherein presenting the set of messages further includes:

presenting one of a graphical representation of textual data, an organized display of textual data, a word cloud, or a list of messages.

8. The computer-implemented method of claim 1, further comprising:

determining text for individual messages of the plurality of messages using one of a text extraction technique or an automated speech recognition technique.

9. The computer-implemented method of claim 1, further comprising:

for each previous time period of the plurality of previous time periods, training a prediction model for a previous time period on messages associated with the previous time period;

evaluating the prediction model on each message in a holdout set of messages for the previous time period to obtain a representative confidence score for the previous time period; and storing the representative confidence score for the previous time period.

10. A system, comprising:

at least one computer comprising at least one processor and at least one memory, the at least one computer configured to:

obtain a plurality of messages associated with a current time period, individual messages being associated with a timestamp within the current time period;

determine that a total number of the plurality of messages received within the current time period is below a threshold number of messages;

buffer additional messages from a previous period of time with the plurality of messages, a number of the additional messages obtained satisfying a difference between the threshold number of messages and the total number of the plurality of messages;

separate a combination of the plurality of messages and the additional messages into a first set of messages, a second set of messages, and a holdout set of messages based on respective timestamps, wherein the first set of messages includes a first portion of the combination of the plurality of messages and the additional messages received before the current time period, the second set of messages includes a second portion of the combination of the plurality of messages and the additional messages received during the current time period, and the holdout set of messages includes a third portion of the combination of the plurality of messages and the additional messages received during the current time period and disjoint from the second set of messages;

train a prediction model on the first set of messages and the second set of messages to predict whether a message is received before the current time period or during the current time period;

evaluate the prediction model on each message in the holdout set of messages to generate a set of confidence scores corresponding to the holdout set of messages, wherein a confidence score quantifies a likelihood a message is received before the current time period or during the current time period;

determine a representative confidence score for the current time period based on the set of confidence scores;

obtain a plurality of previous representative confidence scores from a plurality of prediction models trained over a plurality of previous time periods;

apply a model to the plurality of previous representative confidence scores to determine that the representative confidence score for the current time period is associated with an anomalous event;

generate an alert for the anomalous event;

use the set of confidence scores corresponding to the holdout set of messages to select a set of messages; and present the set of messages.

11. The system of claim 10, wherein the at least one computer is further configured to:

use the set of confidence scores to order the holdout set of messages; and determine the representative confidence score using the order of the holdout set of messages.

12. The system of claim 10, wherein the at least one computer is further configured to:

split the plurality of messages into a plurality of groups of first sets of messages, second sets of messages, and holdout sets of messages;

determine a representative confidence score for each holdout set of messages of the plurality of groups to obtain a set of representative confidence scores; and average the set of representative confidence scores to determine the representative confidence score.

13. The system of claim 10, wherein the at least one computer is further configured to present one of a graphical representation of textual data, an organized display of textual data, a word cloud, a list of messages, or business metrics associated with the holdout set of messages, wherein the business metrics include one of a volume of messages causing the alert or a cost for customer support agents to respond to the volume of messages.

14. The system of claim 10, wherein the at least one computer is further configured to:

determine text for individual messages of the plurality of messages using one of a text extraction technique or an automated speech recognition technique.

15. The system of claim 10, wherein the time period is for one of a minute, an hour, a day, or a week.

16. One or more non-transitory, computer-readable media comprising computer executable instructions that, when executed, cause at least one processor to perform actions comprising:

obtaining a plurality of messages associated with a current time period, individual messages being associated with a timestamp within the current time period;

determining that a total number of the plurality of messages received within the current time period is below a threshold number of messages;

buffering additional messages from a previous period of time with the plurality of messages, a number of the additional messages obtained satisfying a difference between the threshold number of messages and the total number of the plurality of messages;

separating a combination of the plurality of messages and the additional messages into a first set of messages, a second set of messages, and a holdout set of messages based on respective timestamps, wherein the first set of messages includes a first portion of the combination of the plurality of messages and the additional messages received before the current time period, the second set of messages includes a second portion of the combination of the plurality of messages and the additional messages received during the current time period, and the holdout set of messages includes a third portion of the combination of the plurality of messages and the additional messages received during the current time period and disjoint from the second set of messages;

training a prediction model on the first set of messages and the second set of messages to predict whether a message is received before the current time period or during the current time period;

evaluating the prediction model on each message in the holdout set of messages to generate a set of confidence scores corresponding to the holdout set of messages, wherein a confidence score quantifies a likelihood a message is received before the current time period or during the current time period;

determining a representative confidence score for the current time period based on the set of confidence scores;

obtaining a plurality of previous representative confidence scores from a plurality of prediction models trained over a plurality of previous time periods;

applying a model to the plurality of previous representative confidence scores to determine that the representative confidence score for the current time period is associated with an anomalous event;

generating an alert for the anomalous event;

using the set of confidence scores corresponding to the holdout set of messages to select a set of messages; and presenting the set of messages.

17. The one or more non-transitory, computer-readable media of claim 16, wherein the at least one processor further performs actions comprising:

using the set of confidence scores to order the holdout set of messages; and determining the representative confidence score using the order of the holdout set of messages.

18. The one or more non-transitory, computer-readable media of claim 16, wherein the at least one processor further performs actions comprising:

splitting the plurality of messages into a plurality of groups of first sets of messages, second sets of messages, and holdout sets of messages;

determining a representative confidence score for each holdout set of messages of the plurality of groups to obtain a set of representative confidence scores; and averaging the set of representative confidence scores to determine the representative confidence score.

* * * * *